United States Patent
Costales

[11] 3,900,732
[45] Aug. 19, 1975

[54] ENCODER DISC MOUNT AND ALIGNING TOOL

[75] Inventor: John E. Costales, Canoga Park, Calif.

[73] Assignee: Litton Systems, Inc., Beverly Hills, Calif.

[22] Filed: Apr. 15, 1974

[21] Appl. No.: 460,871

[52] U.S. Cl. .......... 250/231 SE; 29/271; 33/180 R; 250/233; 250/234; 356/172
[51] Int. Cl.² .................. G01D 5/36; B25B 27/14
[58] Field of Search .......... 250/231 SE, 231 R, 233, 250/200, 236, 234; 324/175; 81/1 R; 235/92 V; 33/180 R, 181 R; 340/271; 350/115; 356/138, 153, 172; 29/271, 274

[56] References Cited
UNITED STATES PATENTS
| | | | |
|---|---|---|---|
| 3,693,023 | 9/1972 | Wasserman | 250/231 SE |
| 3,725,902 | 4/1973 | Finnegan | 340/347 P |
| 3,728,551 | 4/1973 | Culver et al. | 250/231 SE |

*Primary Examiner*—James W. Lawrence
*Assistant Examiner*—E. R. LaRoche
*Attorney, Agent, or Firm*—Alan C. Rose, Esq.; Thomas A. Turner, Jr., Esq.

[57] ABSTRACT

An encoder assembly is described having a replaceable detecting assembly with a construction allowing alignment of the detecting assembly with an encoder shaft and wheel affording an encoder assembly having resolution of at least 500 cycles per revolution.

4 Claims, 2 Drawing Figures

ENCODER DISC MOUNT AND ALIGNING TOOL

BACKGROUND OF THE INVENTION

Frequently in encoder assemblies, encoder plates are made so that the encoder plate is a wheel. The encoder wheel is normally mounted fixed on a shaft on the encoder assembly so that it rotates with the shaft at predetermined rotational speeds. The encoder wheel, customarily, has a pattern upon it dividing the encoder wheel into concentric rings or concentric circular rows having conducting portions and nonconducting portions on them. As the encoder wheel rotates with the shaft, fixed commutating detecting means sense the conducting portions and the nonconducting portions, and communicate various switching or signaling information to further electrical circuitry. The encoder assembly could be an opto-electric assembly, or a mechanical brush-type electrically conducting pick up arrangement. In the opto-electric detection or sensing arrangement, light is directed onto the encoder wheel's patterned area. Portions of the encoder wheel which are opaque deny light conductance through the encoder wheel. Portions of the encoder wheel, however, are transparent and allow light to pass therethrough during the period that the transparent portions of the pattern on the encoder wheel are presented to the directed light. Detection means on the opposite side of the encoder wheel selectively detect when light is passed through the transparent portions of the encoder wheel pattern, and transmit electrical signals responsive to the aforementioned pattern on the encoder wheel.

Brush-type pick ups operate to produce similar type signal outputs. The brushes slide along the patterned encoder wheel, and transmit electrical signals when the brush slides across conductive portions of the wheel.

Encoder wheels are required to spin at substantial revolutions per minute. The encoder wheel frequently is required to have no more than 0.0003 inch between the encoder wheel and the sensing or detecting assembly through which the encoder wheel moves. Encoder wheels are frequently approximately two to three inches in diameter, are frequently required to withstand axial forces of up to twenty-five pounds plus or minus ten pounds. The encoder wheel frequently has slits or brush contact conductive portions on the order of forty-millionth of an inch. The change of the conductive to nonconductive portions on the encoder wheel each causes an electrical signal, and usually a one pie radian electrical cycle wave. Frequently, 500 or sometimes 1000 cycles per revolution of the encoder wheel is sought. It becomes immediately apparent, therefore, that the alignment of the sensing or detecting assembly about the encoder wheel must be accurate to a very small degree of tolerance.

Frequently, the detecting assembly wears out. The detecting pattern on the detecting assembly frequently changes as a result of constant use. The signal amplifiers frequently attached to such detecting assemblies also wear out. Sometimes, for further example, the brush contacts contacting the encoder wheel change the pattern change over points by constant contact or wear. In opto-electric encoder wheels, the opaque section sometimes loses its opaque qualities and, vice versa, the transparent portions of the pattern frequently lose the sharp and distinct edges of transparency. Thus in the industry, it is frequent that a new detecting assembly is required to replace a worn-out sensing assembly. The shafts of encoder assemblies, it should be understood, last substantially longer than many lifetimes of detecting assemblies. Because of the very small degree of tolerance that can be accepted between the encoder wheel with its shaft, and the sensing or detecting assembly, each detecting assembly must be assembled relative to the shaft with a great degree of care and precision. In the past, in almost all cases, oscilloscopes were required in order to steady and align the electrical waveforms formed by the brush contacts, optical slits or the like of the detecting assembly relative to encoder wheel and shaft. The finite adjustments ultimately required in such a centering or aligning operation are frequently made by hand. In some such cases expensive, specially designed manipulators are required which are difficult to use, and very time consuming. A difficult encoder and detecting means assembly could take as long as four to eight hours for precise alignment.

If the sensing assembly is placed closer to the encoder wheel, the photoconductive slits through which the signal light passes to the detecting devices such as slits, will make sharp, clean breaks in spite of the characteristic weakness of the photobeam or light. The closer the sensing device is to the encoder wheel, the greater the resolution of the signal or conductivity change will be. Thus, less noise and other electrical interference will be realized.

In the past it has been known to construct sensing plates for a mounting on encoder shafts having alignment plates attached thereto. In every instance of such use in the past, however, the alignment plate was carefully constructed on each such sensing assembly, and fixed thereto. Once such a sensing or detecting assembly had been mounted on the encoder shaft, the alignment plate was removed and discarded.

It has not been known before, therefore, to provide a reusable aligning tool capable of centering an encoder detecting assembly on an encoder shaft with accuracy reliable certainly to 500 cycles per revolution, and in many cases up to 1000 cycles per revolution.

SUMMARY OF THE DISCLOSURE

An aligning tool for use in conjunction with a replaceable detecting assembly used in rotary shaft encoder assemblies is described. The tool is specially usable in a detecting assembly having amplifier means attached directly to the plate of the detecting assembly. The aligning tool is reusable, and offers resolution alignment of up to 1000 cycles per revolution.

DESCRIPTION OF THE PREFERRED EMBODIMENT

Figure 1:
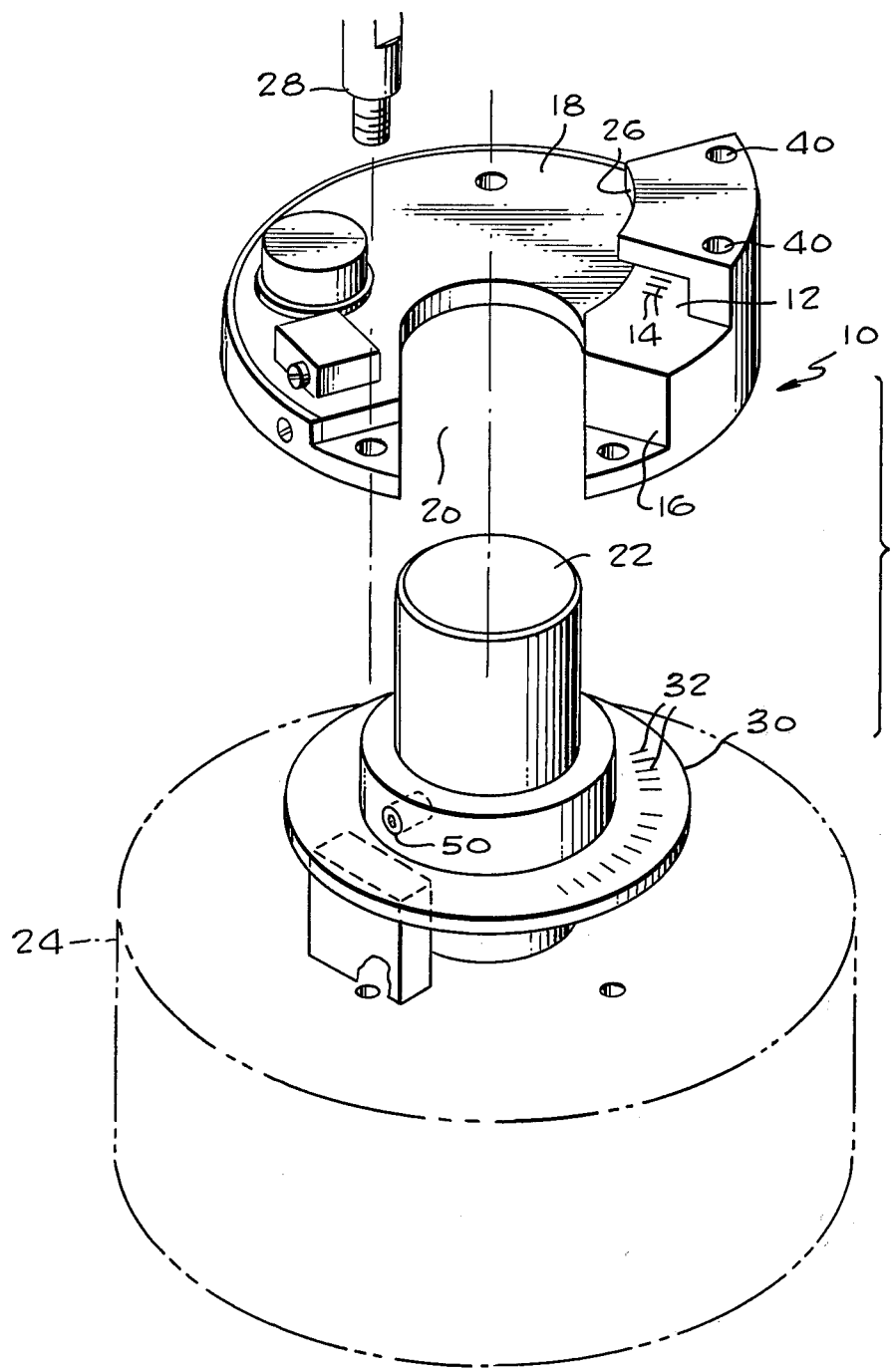
FIG. 1 illustrates a detecting assembly used in the preferred embodiment of the invention.

To achieve the aforementioned objectives, an encoder assembly alignment tool in conjunction with a detecting assembly 10 is described, reference being had intially to FIG. 1 of the drawings. Sensing or detecting assembly 10 is constructed having a slot 12 through which an encoder wheel 30, to be described in further detail below, can pass. In the embodiment shown in the accompanying drawings, an optoelectric encoder wheel 30 having slits 32 or other transparent portions constituting a pattern on the encoder wheel 30 is used. The detecting assembly 10, likewise, has opto-electric receiving slits 14 on the bottom portion 16 of detecting assembly cavity 12, through which cavity the encoder wheel 30 passes. The detecting assembly 10, preferably, has amplifier means constructed directly in contact with sensing receiving slits 14. The amplifier, for example, could be housed within bottom portion 16 mounted on top of the plate 18 of the detecting assembly 10.

The plate or base 18 of detecting assembly 10 has a recess 20 depending from the circumference of plate 18 at least to the axis of the circular plate 18. With the recess 20, the detecting assembly 10 can be positioned into axial alignment with the shaft 22 rotatably mounted within permanent base 24. The encoder wheel 30 rotates with shaft 22 at predetermined and selected speeds of revolution. With such a recess 20, the detecting assembly can be positioned around wheel 30 without removing wheel 30 from the shaft 22.

It is desired, as discussed above, to have the sensing assembly 10 mounted in very close relationship with encoder wheel 30. Thus, the sharper and more discrete changes will be from the reception of light through the slits 32 onto the photoreceiving means, such as slits 14. As can be seen from the drawings, the very slightest axial or radial misalignment of the sensing device 10 relative to the encoder wheel 30 will cause substantial and critical variations in the signal receiving pattern. It is proposed, therefore, to provide receiving means, such as slots 40 on the outside, upper portion 26 of cavity 12. Upper portion 26 of cavity 12, further, contains light emitting means, not shown, for directing light through the slits 32 of encoder wheel 30, thence into the receiving slits 14 of bottom portion 16 of detecting means 10.

Figure 2:
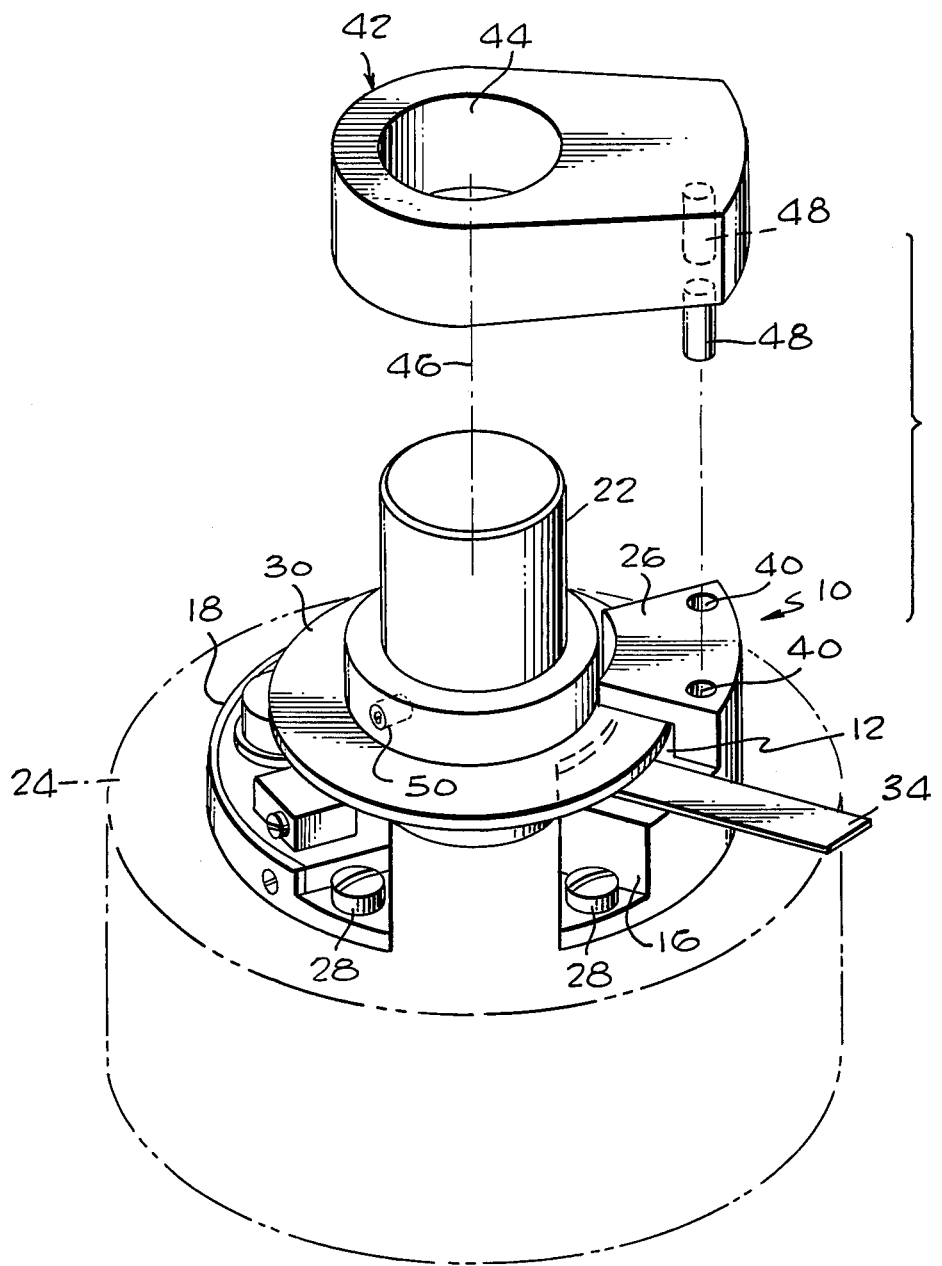
FIG. 2 illustrates the preferred form of the invention in conjunction with an encoder assembly.

The slots 40 are better seen in FIG. 2 of the accompanying drawings, where the detecting assembly 10 has been positioned about axle or shaft 22, and loosely fastened to base 24 by means of fastening devices such as screws 28. The correct spacing between the amplifier mount 16 and the encoder wheel 30 can be made by a gap spacing tool 34, if desired.

For precise aligning of the detecting means 10, alignment tool 42 is shown. Alignment tool 42 is constructed having a cylindrical void or bore 44 removed from a portion of the tool 42. The cylindrical void 44 is cut so that it might be mounted about shaft 22. The fit of void 44 onto shaft 22 should be extremely close, so that the precise positioning of alignment tool 42 relative to the centerline 46 of shaft 22 is as near perfect as possible. The alignment tool 42, further, is shown having a portion extending from the centerline 46 of shaft 22 having prongs 48 depending therefrom. Prongs 48 are designed for complemental insertion into receiving means 40 recessed in the upper portion 26 of detecting means 10.

In operation, the aligning tool 42 is positioned onto shaft 22, causing the void 44 to fit about shaft 22 in perfect axial alignment. The prongs 48 are positioned into two recesses or receiving means 40 recessed within the upper portion 26 of the amplifying, photoemission and photodetecting assembly 16 of detecting means 10. Once the cavity 12 of detecting means 10 is aligned perfectly with shaft 22, the plate 18 of detecting means 10 is tightly fastened to base 24 by tightening screws 28 fastening the plate 18 to the base 24. Furthermore, screw 50, if necessary, can be fastened, securing encoder wheel 30 with shaft 22. In such a manner, the detecting means 10 is quickly, efficiently and precisely aligned relative to base 24 and encoder shaft 22. Moreover, the rotating encoder wheel 30 is precisely and rotatably fixed relative to detecting means 10.

In actual practice with such an aligning tool 42, it has been found that resolutions certainly of 500 cycles per revolution, and in many cases of up to 1000 cylces per revolution have been achieved on encoder wheels having opto-electric photoslits of forty-millionth of an inch and spacing between the encoder wheel 30 and the opto-detecting slits 14 on the order of approximately 0.0003 inches.

In passing, it may be noted that the diamter of the void or bore 44 is within one ten-thousandth of an inch of that of shaft 22. Similarly, the prongs or pins 48 fit the slots 40 with tolerances of approximately one ten-thousandth of an inch. It is by the holding of these close tolerances that the exceedingly close concentricity between detecting assembly 10 and the encoder disc 30 is achieved.

The alignment tool 42, after the tightening of screws 28 and 50 so as to fix the positions of encoder wheel 30 and detecting means 10 relative to shaft 22 and each other, can be used to position detecting means and encoder wheels of additional encoder assemblies. It can be seen from the above description of the aligning tool 42 that a reusable means for aligning a detecting assembly with an encoder wheel in an encoder assembly requiring only a few minutes can be had, and savings of several hours can be achieved.

I claim:

1. An encoder assembly in combination with an alignment tool for aligning an encoder detecting assembly with a rotatable encoder plate having a rotating shaft, comprising:
    a. a removable tool including a void adapted to fit about said shaft;
    b. at least two prongs depending from said tool and spaced from said void; and
    c. said encoder detecting assembly including at least two discrete receiving means capable of simultaneously receiving said at least two prongs when said void is fitted about said shaft, whereby said encoder detecting assembly is capable of being fixed relative to said rotatable encoder plate at a resolution of 500 cycles per revolution of said encoder plate.

2. An encoder assembly as claimed in claim 1 wherein said rotating shaft is cylindrical in structure, and further wherein said void is cylindrical in structure.

3. An encoder assembly as claimed in claim 2 wherein said detecting assembly further includes a circularly shaped base having a recess depending from a circumference of said base and extending to a center of said base.

4. An encoder assembly as claimed in claim 2 wherein said detecting assembly further includes signal amplifier means mounted within, and further includes photo-receiving means positioned approximately 0.0003 inch from said rotatable encoder plate.

* * * * *